United States Patent Office 3,846,200
Patented Nov. 5, 1974

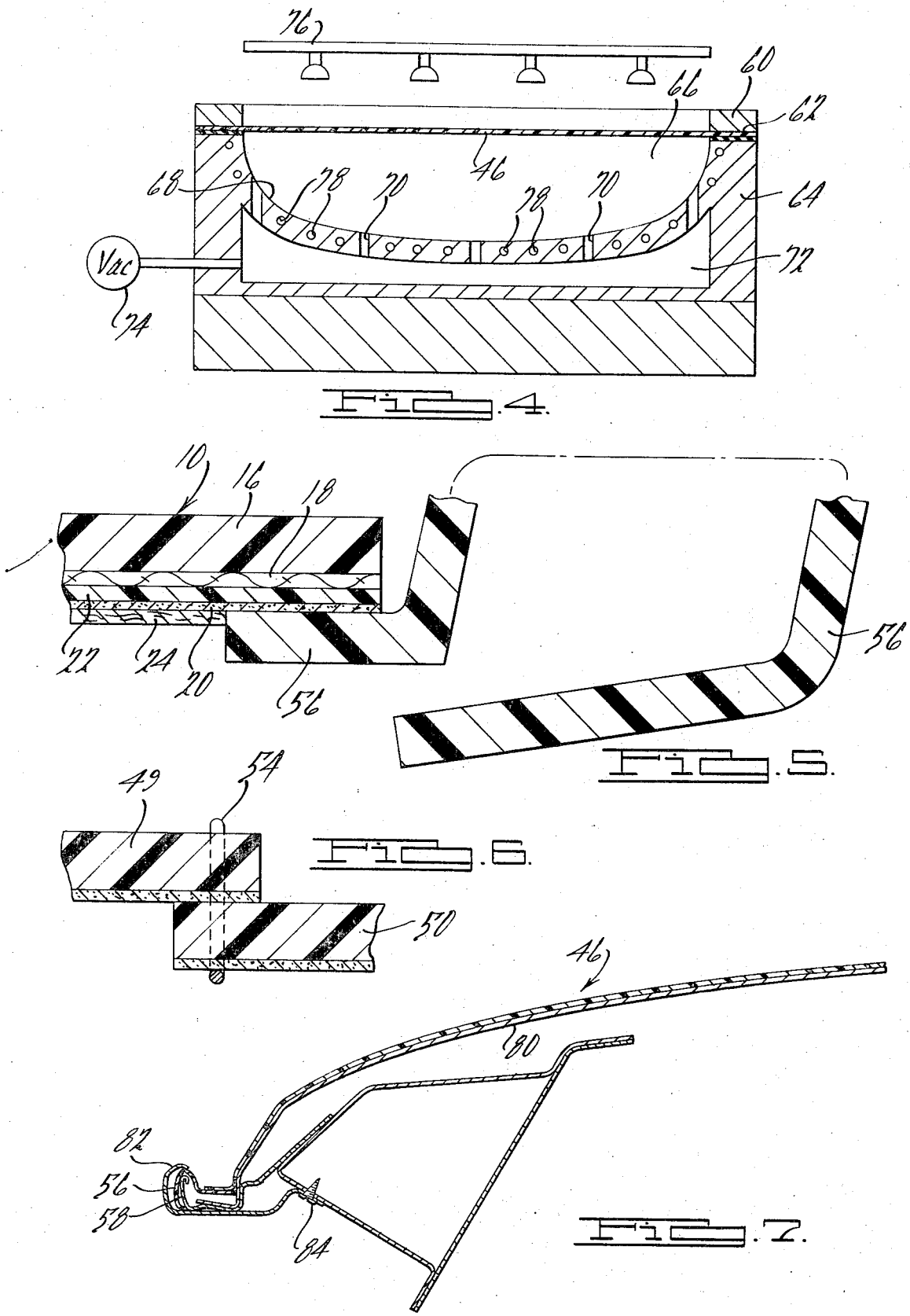

3,846,200
DECORATIVE COVERING AND METHOD FOR APPLYING DECORATIVE COVERING TO VEHICLE PANELS
Ralph G. Doerfling, Walled Lake, and Charles J. Motycka, Detroit, Mich., assignors to Detroit Gasket and Manufacturing Company, Oak Park, Mich.
Filed May 22, 1972, Ser. No. 255,797
Int. Cl. B29c 3/00
U.S. Cl. 156—85
7 Claims

ABSTRACT OF THE DISCLOSURE

A decorative covering material and a process for applying said covering material to vehicle panels such as the roof panel of automobiles to enhance the exterior appearance thereof. The decorative covering material comprises a heat-softenable plastic sheet incorporating a coating of a heat-activatable adhesive over substantially the entire undersurface thereof and which sheet is pre-trimmed to a preselected shape and size, and incorporates fastening strips along at least a portion of the terminal edges thereof for securing the decorative material over the panel to prevent movement thereof relative to the panel surface. The decorative covering material is further characterized as embodying, in the inner central area thereof, a contour and wherein the plastic material incorporates a residual memory whereupon a shrinkage of the covering material occurs during a heating thereof to form a smooth and taut covering layer over the exterior surface of a panel to which it is applied. In its method aspects, the present invention encompasses the process of fabricating the pretrimmed and precontoured covering material and its installation over vehicle panels and the like.

BACKGROUND OF THE INVENTION

The use of vinyl and other decorative plastic covering materials on automobile roof tops to enhance the aesthetic appearance thereof is well known and in widespread use. A large variety of different techniques have heretofore been proposed for installing such decoative covering materials in an effort to reduce cost and to further assure that the covering material after installation is adherent over substantially the entire surface of the panel and is devoid of any bubbles, wrinkles or other areas of poor fit or surface imperfections. A further problem associated with such prior art techniques has been the large number of man-hours required in preparing a vehicle for reception of a decoative roof covering, as well as the time and number of persons required for the installation of the cover and the trimming thereof along the periphery of the panel. Such techniques have also required a high degree of precaution to avoid damage or marring of other exterior surfaces of the automobile to avoid the cost and nuisance of subjecting the vehicle to spot repair or rework to correct such damage.

Typically, the process heretofore employed for applying decorative plastic covering materials such as vinyl to automobile roof tops has involved the cutting of a rectangular blank of the material of a size in excess of the area of the panel to be covered. In those instances in which it is known that a vehicle is to be equipped with a vinyl roof, the final finish coat of paint is omitted and the primed roof panel is coated with a pressure sensitive adhesive in a manner so as to avoid any air entrapment therein. This requires a complete masking of the adjacent body panels and windows to avoid the deposition of adhesive thereon which, in some instances, adversely reacts with the paint finish. The underside of the vinyl covering material is also coated with the pressure sensitive adhesive.

In order to avoid premature bonding of the covering material to the coated roof panel, slip sheets are normally interposed between the covering material and roof panel to enable a hand-positioning and location of the covering material, whereafter the slip sheets are withdrawn and the covering material is hand-smoothened and worked into an adherent and shape-conforming covering. Thereafter, the terminal edge portions of the covering material are trimmed, producing costly scrap, and finaly the masking material and any oversprayed adhesive are cleaned from the adjoining uncovered surfaces of the vehicle.

It will be apparent from the foregoing that the process constitutes a costly and time-consuming operation and also has a tendency to cause possible damage to other sections of the vehicle. In accordance with the decorative covering material and method comprising the present invention, a prefabricated and stretched decorative covering material can be provided which can be simply applied and secured along its terminal edges to a vehicle panel and thereafter shrunk and bonded in the form of a smooth and taut covering without requiring any trimming thereby substantially reducing the quantity of scrap produced in the installation of such decorative materials.

SUMMARY OF THE INVENTION

The benefits and advantages of the present invention are achieved in the provision of a decorative covering material comprised of a plastic sheet composed of a heat-softenable material, such as a vinyl plastic, for example, and having a heat-activatable adhesive film over substantially the entire underside surface thereof. The covering material may be comprised of a single unitary sheet or, alternatively, may be comprised of two or more sections joined to each other to form a pretrimmed assembly of a preselected size and shape and including fastening means along at least a portion of the terminal edges thereof for securing the covering material in appropriate alignment over a vehicle panel to prevent movement of the covering material relative to the panel during the assembly operation. The covering material is further characterized as being provided with a convex contour over at least the central inner area thereof which incorporates residual stresses or a memory, whereby a shrinkage of the covering material is effected in response to a heating thereof to a temperature at which the sheet is plastically deformable.

In its method aspects, the present invention contemplates the installation of a composite pretrimmed covering material, as hereinabove described, by accurately locating the covering material on a roof panel and thereafter applying heat to the covering material effecting a shrinkage thereof into a smooth form-fitting covering which, in response to the activation of the adhesive film on the underside thereof, also forms a tenacious bond, assuring a durable high-strength assembly. The method further contemplates the fabrication of the composite pretrimmed covering material.

Additional benefits and advantages of the present invention will become apparent upon a reading of the description of the preferred embodiments taken in conjunction with the accompanying drawings.

BRIEF DESCRIPTION OF THE DRAWINGS

FIG. 4 is a transverse vertical sectional view through a vacuum mold suitable for imparting a contour to covering materials preparatory to installation on a vehicle panel;

FIG. 5 is a magnified transverse sectional view through a terminal edge portion of the covering material as shown in FIG. 3, and taken substantially along the line 5-5 thereof;

FIG. 6 is a magnified transverse sectional view of a seam of the composite covering material as shown in FIG. 3, and taken substantially along the line 6-6 thereof; and FIG. 7 is a fragmentary transverse sectional view taken through the edge of the roof section of an automobile body and illustrating, in particular, the manner by which the terminal edge portion of the covering material is affixed to the drip rail section of the roof panel.

DESCRIPTION OF THE PREFERRED EMBODIMENTS

Figure 1:
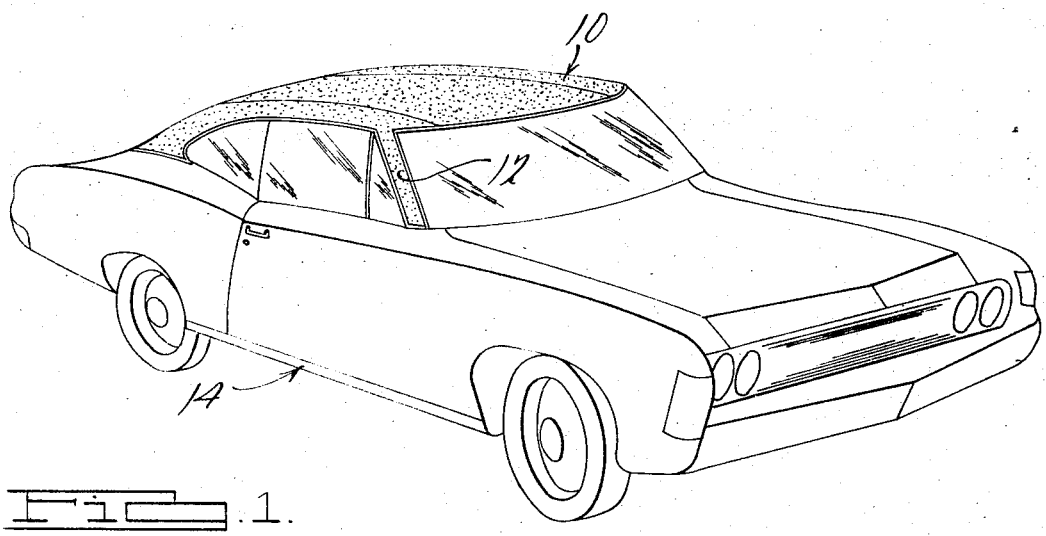
FIG. 1 is a perspective view of an automobile provided with a decorative plastic covering material on the roof panel thereof.

Referring now in detail to the drawings, and as may be best seen in FIG. 1, a decorative vinyl covering material 10 is illustrated as applied to the roof panel and the exterior faces of the windshield "A" pillar posts 12 of a conventional two-door hardtop sedan 14. It will be appreciated that the composite pretrimmed covering material and the method of installation are equally applicable for use in alternate vehicle design configurations including other exterior or interior panels or sections thereof as may be desired in carrying out any desired decorative scheme.

The decorative covering material 10, as best seen in FIG. 5, is comprised of a plastic facing sheet 16, which may be composed of any plastic material which is of a thermoplastic or pseudo-thermoplastic character, enabling a heat-softening thereof at moderate temperatures, and which, moreover, is resistant to weather and ultraviolet light, providing for a long, useful life. It is important that the facing sheet be possessed of a heat-softening temperature above that at which it may normally become heated during use, such as may be encountered during the parking of a vehicle in direct exposure to the hot sunlight. Heat-softening temperatures of above about 200° F., are usually satisfactory for the vast majority of automobile exposure situations, whereby the facing sheet retains a sufficient degree of strength and abrasion and impact resistance to provide for satisfactory service. On the other hand, the heat-softening point of the facing sheet should not be excessively high since it is desirable, in many instances, to apply the decorative covering material to an automobile which, in all other respects, is substantially completely finished, and the use of excessively high temperatures at this stage of manufacture might result in damage or injury to other trim materials and functional components. Generally, heat-softening points of less than about 300° F., have been found satisfactory for use in conventional automobile assembly operations since the short duration of heating required in the practice of the process comprising the present invention frequently does not permit other components immediately adjacent to the roof panel to attain a temperature approaching that to which the decorative covering material is heated.

Facing sheets comprised of synthetic plastic materials which are possessed of the foregoing physical properties or which incorporate suitable plasticizers and/or filler agents to modify the physical properties within the desired range can be satisfactorily employed for this purpose, of which vinyl-type facing sheets are particularly satisfactory. Among such vinyl plastics are those designated by the brand name "Naugahyde," obtainable from United States Rubber Company, and by the brand name "Fabrilite," available from the Du Pont de Nemours Company. Such vinyl facing sheets are further characterized as being available in a variety of widths and in indefinite lengths and can be further provided with a suitable embossed pattern such as a simulated leather graining on one or both face surfaces thereof.

While such vinyl facing sheets can be satisfactorily employed in an unsupported condition, it is preferred to employ facing sheets having a knitted fabric backing 18, as shown in FIG 5, which is bonded or otherwise interlocked with and to the underside surface of the facing sheet. Knitted fabric-backed vinyl facing sheets having a a grained exterior face surface and having a weight of from about 14 to about 24 ounces per square yard have been found particularly satisfactory for forming durable and weather-resistant decorative covering materials for exterior automobile panels.

A suitable coating or layer 20 of a heat-activatable adhesive is applied over substantially the entire underside surface of the facing sheet directly to the fabric backing 18 or, alternatively, over an intervening barrier coating or film 22. The use of a barrier coating 22 is desirable in some instances to prevent or inhibit undesired migration of constituents to and from the adhesive film to the exterior surface of the facing sheet 16, which may produce a discoloration or other surface imperfection therein. The barrier coating 22 may also serve as a so-called ti-coat for enhancing the strength of the initial or final bond of the adhesive coating to the underside of the facing sheet. The barrier coating may comprise any suitable natural or synthetic base resinous or plastic material which may additionally include suitable filler materials, as may be desired, that in combination are compatible with the facing sheet and the adhesive layer as well as being resistant to the temperatures to which the decorative covering material is subjected during fabrication and installation.

The adhesive coating or film 20 is comprised of a heat-activatable substance such that the film itself is latent until it is heated to an elevated threshold temperaure at which it becomes tacky and thereafter is adapted to adhesively bond to the underlying substrate. For this purpose, the temperature at which the adhesive film is activated is preferably one which is above the initial heat-softening point of the facing sheet so as to enable an initial heating of the facing sheet to the appropriate temperature without incurring any tackifying of the adhesive film, permitting freedom of relative movement between the covering material and the surface of the panel during the installaiton. After the covering material has been appropriately smoothened and shrunk into a contour-fitting taut overlying layer, a further heating of the covering material thereafter effects a tackification and subsequent activation of the adhesive film, where, upon subsequent cooling, a tenacious bond is obtained.

The heat-activatible adhesive film is usually applied in the form of a coating or layer ranging from about 0.002 to about 0.035 inch and, more usually, from about 0.003 to about 0.010 inch thick. The composition of the adhesive film itself may comprise any heat-responsive material which, after being heated above a threshold temperature, heat softens and/or tackifies such that upon subsequent cooling and hardening thereof, a tenacious, substantially permanent-type bond is formed. Thermoplastic or pseudo-thermoplastic materials, including modified polyamide resins, ethylene vinyl acetate copolymers, and polyester-type resins having heat-softening and tackifying characteristics at temperatures usually about 30° F., above the initial heat-softening point of the facing sheet, can be satisfactorily employed for this purpose.

The adhesive film 20 can be applied to the underside of the facing sheet, either by a direct film extrusion technique, by casting the film in the form of a molten curtainous stream directly on the rear surface, or alternatively, by applying a powdered layer which, upon subsequent heating, is fused into a substantially continuous film of uniform thickness. In any event, during the storage and shipment of the composite pretrimmed covering material, it is frequently desirable to prevent any inadvertent adherence between adjacent layers when stacked one upon another, whereby it is usually preferred to employ a release liner, indicated at 24 in FIG. 5, which overlies substantially the entire face of the adhesive film. The release liner may comprise any suitable film-like material including papers incorporating silicon-base release agents and waxes which are not adherent to the adhesive film and can readily be stripped therefrom prior to installation of the covering material without incurring any off-setting of the adhesive film.

Figure 2:
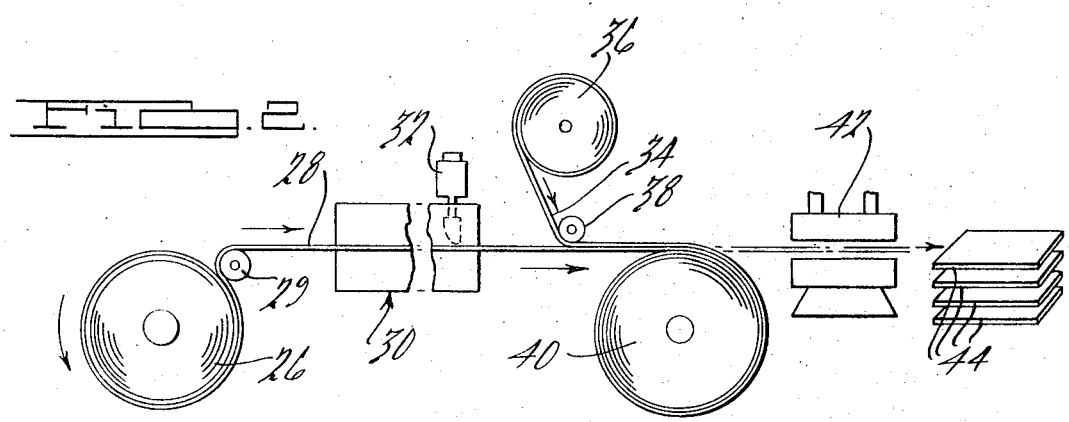
FIG. 2 is a schematic side elevational view illustrating the coating and trimming steps of the process for fabricating the covering material in accordance with the method aspects of the present invention.

Referring now to FIG. 2 of the drawings, a typical process is schematically illustrated in which a supply roll 26 of a suitable fabric-backed facing sheet 28 is continuously unwound and is advanced around a roll 29 in a substantially horizontal direction through an oven 30 having a coating assembly 32 mounted adjacent to the output end thereof. The coating assembly 32 is operative to apply a suitable hot metal adhesive film to the underside surface of the facting sheet 28, whereafter, upon exiting from the oven 30, it is cooled and a suitable release liner 34, supplied in the form of a roll 36, is applied by means of a nip roll 38 in overlying relationship on the exposed face of the adhesive film. The resultant adhesively-coated facing sheet can be wound on a suitable take-up roll 40 for storage prior to the next processing operation or, alternatively, can be continuously advanced between the jaws of a die-cutting apparatus 42 in which blanks or sections 44 of an appropriate size and shape are cut in a manner to minimize trim scrap.

Figure 3:
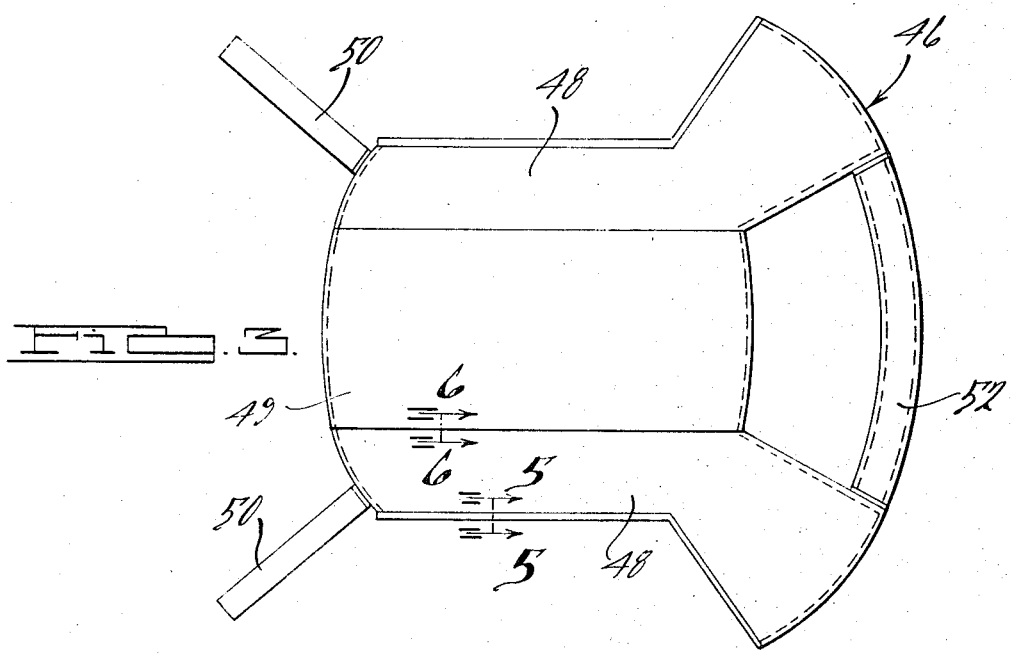
FIG. 3 is a plan view of the typical pretrimmed and assembled covering material comprised of a plurality of die-cut sections securely fastened to each other along longitudinally extending seams.

In accordance with the foregoing arrangement, a variety of sections of different shapes can be successively or simultaneously die-cut from the continuous web of facing material, which thereafter can be assembled, as is best seen in FIG. 3, into a roof liner 46. The roof liner 46, as shown, comprises two side sections 48 and a center section 49. A pair of elongated section 50 are secured to the forward edges of the slide sections 48 which are adapted to overlie the windshield pillar posts 12 as shown in FIG. 1 of the drawings. An arcuate strip 52 is also affixed to and extends between the rearward portion of the side sections 48 and is adapted to cover that portion of the roof panel immediately below the rear window of the vehicle. The joining of the various sections to each other can be satisfactorily achieved by utilizing simulated or actual stitching, such as represented by the stitching 54 of FIG. 6 by which the edge of the center section 49 is joined to the edge of one of the side sections 48. In accordance with a preferred practice, the preliminarily sewn seams are subseqently dielectrically bonded to form a strong water-proof decorative seam.

In order to facilitate a location and a fastening of the roof liner 46 along its terminal edges to the roof panel to prevent relative movement thereof during installation, elongated resilient plastic strips 56, as best seen in FIGS. 3, 5 and 7, are secured along at least a portion of the edges of the roof liner. The fastening strips 56 are of a hooked-shaped cross section and are adapted to overlie and engage a metal drip rail 58 disposed along the side edges of the roof panel and downwardly along the rearward edge of the side window. Preferably, the fastening strips 56 are comprised of an extruded vinyl plastic and are dielectrically bonded or otherwise adhesively secured to the underside of the edge portions of the roof liner. In addition to the fastening strips 56, supplemental fastening devices, including staples, double-face pressure sensitive adhesive tapes, screws, garnish moldings and the like, can be employed for securing the edge portions of the roof liner during its installation on the roof panel of an automobile.

The roof liner 46 is shown in FIG. 3 in a fully assembled and flat condition. After attaining this stage of assembly, the roof liner is subjected to a heat stretching operation to impart a convex contour therein of a magnitude in excess of the contour of the convex roof panel over which it is to be applied. The contour is imparted to the roof liner in a manner to leave a residual stress or memory, tending to cause the liner to again return to a flat or original configuration upon a reheating thereof to a heat-softening point. A convenient manner for imparting a contour in at least the central inner area of the roof liner, involves the use of a mold arrangement as shown in FIG. 4. As shown, the roof liner 46 is adapted to be clamped along its edges between an overlying frame 60 and a flange 62 of a mold 64 defining a contoured cavity 66. The inner mold surface 68 is of a generally porous structure including ports 70 which are adapted to be disposed in communication with a vacuum chamber 72 connected to a vacuum pump 74 for drawing the roof liner down when in a heat-softened condition.

A heating of the roof liner 46 is achieved such as by a bank of heat lamps 76, which are directed against the rear surface of the roof liner with the exterior facing sheet thereof oriented downwardly toward the mold surface 68. Upon an appropriate heating of the roof liner to the temperature such as from about 230° F., to about 275° F., and preferably from about 240° F., to about 250° F., in combination with vacuum, a convex contouring of the central section of the roof liner occurs, whereafter the bank of heat lamps is extinguished. A suitable cooling fluid is circulated through conduits 78 disposed adjacent to the mold surface, whereby the roof liner is immediately cooled upon coming in contact therewith to a temperature below its heat-softening point, thereby retaining at least a portion of the contouring therein after a release of the vacuum.

The assembled and contoured roof liner can be stored indefinitely until such time it is to be installed and at which time the release liner is removed from the underside surface thereof and the liner is applied in overlying relationship on a roof panel, such as the roof panel 80 shown in FIG. 7. The roof liner is of a size in excess of that required with due allowance of the shrinkability of the liner upon again being reheated to the heat-softening point. An appropriate location and fastening of the terminal edge portions of the liner are achieved such as by the fastening strips 56 applied in engagement over the drip rail 58, whereafter a chrome-plated garnish molding 82 is secured such as by means of screws 84 as shown in FIG. 7 securely locking the edges of the roof liner in place. Supplemental fastening of edges in sections such as the elongated sections 50 and the arcuate strip 52 (FIG. 3), can be achieved by staples or double-faced pressure sensitive adhesive tape to prevent relative movement of the edges during the subsequent heating step.

With the roof liner in appropriate fastening position on the vehicle roof panel, heating of the exterior face sheet is effected such as by means of a bank of heat lamps similar to that shown in FIG. 4, whereupon the residual stresses or memory in the sheet effects a progressive shrinkage thereof to form a smooth and taut shape-conforming covering layer. Continued heating of the roof liner effects a further increase in its temperature and an activation of the adhesive film on the underside thereof which becomes tacky and effects a bonding of the liner to the underlying roof panel. Upon removal of the heat and a subsequent cooling of the roof panel and liner, the adhesive bond rigidifies, forming an integral high-strength and durable assembly.

While it will be apparent that the invention herein disclosed is well calculated to achieve the benefits and advantages as herein above set forth, it will be appreciated that the invention is susceptible to modification, variation and change without departing from the spirit thereof.

What is claimed is:

1. A process for applying a decorative plastic sheet on convex exterior vehicle panels comprising the steps of applying a heat-activatable adhesive film over substantially the entire undersurface of a heat-softenable decorative sheet, affixing strips of fastening means along at least a portion of the edges of said sheet to facilitate a securing of the terminal edge portions thereof against movement relative to a vehicle panel, heating said sheet to an elevated temperature at which said sheet is plastically deformable, stretching the heated said sheet to impart a contour therein of a magnitude in excess of the panel over which said sheet is applied, cooling the stretched said sheet to a temperature below the heat softening range thereof and in a manner to retain at least a portion of the excess of said contour therein and a memory of the original non-stretched configuration thereof, placing the contoured said sheet with said adhesive film positioned in overlying relationship against the surface of a vehicle panel, securing the terminal edge portions of said sheet against movement relative to said panel, heating said sheet to effect a heat softening and a contraction of said sheet in response to its memory into smooth and taut overlying relationship on said panel, continuing the heating of said sheet to effect an activation of said adhesive film and a bonding of said sheet to said panel, and thereafter cooling said sheet and said film.

2. The process as defined in claim 1, wherein said sheet comprises a vinyl plastic and incorporates a knitted fabric backing.

3. The process as defined in claim 1, in which said adhesive film is applied in the form of a substantially uniform layer of a thickness ranging from about 0.002 to about 0.035 inch.

4. The process as defined in claim 1, in which said adhesive film is applied in the form of a substantially uniform layer of a thickness ranging from about 0.003 to about 0.010 inch.

5. The process as defined in claim 1, including the further step of trimming said sheet to a preselected shape and size prior to stretching thereof.

6. The process as defined in claim 1, including the further step of applying a coating of a barrier material to the undersurface of said sheet prior to the application of said adhesive film.

7. The process as defined in claim 1, including the further steps of cutting said sheet after application of said adhesive film into a plurality of sections, and thereafter joining said sections together with a decorative seam prior to a stretching thereof.

References Cited
UNITED STATES PATENTS

| | | | |
|---|---|---|---|
| 3,627,608 | 12/1971 | Steiner et al. | 156—214 |
| 2,706,699 | 4/1955 | Plansoen et al. | 161—89 |
| 3,576,703 | 3/1964 | Baher et al. | 161—77 |
| 3,578,521 | 5/1971 | Evans | 156—85 |
| 3,533,864 | 10/1970 | Ianuzzi | 156—85 |
| 3,388,651 | 6/1968 | Axelrod | 156—85 |
| 3,507,730 | 4/1970 | Gambill et al. | 156—214 |

GEORGE F. LESMES, Primary Examiner

J. J. BELL, Assistant Examiner

U.S. Cl. X.R.

156—212, 214, 229, 245, 306; 161—86, 89, 167, 406; 296—31 P, 137 R